United States Patent [19]

Hoshino et al.

[11] Patent Number: 5,698,800

[45] Date of Patent: Dec. 16, 1997

[54] MIXED RAW MATERIAL FOR PRODUCING POROUS METAL SINTERED PRODUCT

[75] Inventors: Koji Hoshino; Toru Kohno, both of Saitama, Japan

[73] Assignee: Mitsubishi Materials Corporation, Tokyo, Japan

[21] Appl. No.: 691,650

[22] Filed: Aug. 2, 1996

[51] Int. Cl.$^6$ .................. C22C 1/08; B22F 3/11
[52] U.S. Cl. .................. 75/230; 75/245; 75/255; 419/2; 419/36; 419/38
[58] Field of Search .................. 75/230, 245, 255; 419/2, 36, 38

[56] References Cited

U.S. PATENT DOCUMENTS

| | | | |
|---|---|---|---|
| 3,897,221 | 7/1975 | Salyer et al. | 428/566 |
| 4,569,821 | 2/1986 | Duperray et al. | 419/2 |
| 4,871,621 | 10/1989 | Bagley et al. | 428/549 |
| 5,568,652 | 10/1996 | Wu | 419/2 |
| 5,579,532 | 11/1996 | Edd | 419/2 |
| 5,592,686 | 1/1997 | Third et al. | 419/2 |

*Primary Examiner*—Ngoclan Mai
*Attorney, Agent, or Firm*—Armstrong, Westerman, Hattori, McLeland & Naugton

[57] ABSTRACT

The present invention provides a mixed raw material which is capable of producing a porous metal sintered product having high porosity and fine and uniform pores. The mixed raw material for producing a porous metal sintered product is a composition including 0.05 to 10% of water-insoluble hydrocarbon organic solvent having 5 to 8 carbon atoms, 0.05 to 5% of surfactant, 0.5 to 20% of water-soluble resin binder, 5 to 80% of metallic powder having an average particle size of 0.5 to 500 μm, optionally 0.1 to 40% of combustible agent for accelerating pore formation, and optionally, 0.1 to 15% of plasticizer consisting of at least one of polyhydric alcohols, oils and fats, ethers and esters, with a balance of water.

12 Claims, No Drawings

MIXED RAW MATERIAL FOR PRODUCING POROUS METAL SINTERED PRODUCT

FIELD OF THE INVENTION

The present invention relates to a mixed raw material which permits production of a porous metal sintered product having a high porosity and fine pores having a uniform size.

BACKGROUND OF RELATED ART

It is generally well known that a porous metal sintered product is used as a light-weight construction material, various filters, and an electrode plaque for a secondary battery. Methods disclosed in, for example, Japanese Patent Laid-Open Nos. 56-13403 and 3-39605 are known as methods of producing such porous metal sintered products by sintering means.

On the other hand, from the viewpoint of recent weight saving and improvement in function, there has been strong demand for a porous metal sintered product having high porosity. However, the conventional porous metal sintered product has relatively coarse pores having an average pore size of 100 μm or more, thereby causing not only difficulties in increasing the porosity to 80% by volume or more, but also variations in the pore size as the porosity increases. In the present state, the conventional sintered product cannot satisfactorily comply with the demand.

SUMMARY OF THE INVENTION

From the above viewpoint, the inventors thus performed research with attention to providing an increase in porosity of a porous metal sintered product. The research results obtained were as follows: when a surfactant and a water-insoluble organic solvent are added to and mixed with water, colloidal fine droplets referred to as "micelles" having a uniform size, are formed by the phenomenon that the water-insoluble organic solvent is involved in the surfactant, and uniformly dispersed in water. Even when a metallic powder is further added to and mixed with water together with the surfactant and the water-insoluble organic solvent, the same micelles as described above are formed to obtain a mixture in which the micelles are uniformly dispersed in water together with metallic powder. In this case, if a water-insoluble hydrocarbon organic solvent having 5 to 8 carbon atoms is used as the water-insoluble organic solvent, and if the mixture is shaped into a predetermined form by a known doctor blade method or slip cast method, and then kept at a temperature of 5° C. or higher, since the water-insoluble hydrocarbon organic solvent has higher vapor pressure than water, the organic solvent vaporizes from the formed product to form a porous formed product having many fine uniform micelles generated therein. In addition, when a water-soluble resin binder is added to the mixture, the resultant porous formed product has strength which enables handling. When at least one of polyhydric alcohols, oils and fats, ethers and esters is added to the mixture, the porous formed product has plasticity. In addition, when a combustible agent for accelerating pore formation is further added to the mixture to be dispersively distributed in the porous formed product, and when the porous formed product in this state is sintered, a porous metal sintered product having a predetermined high porosity within the range of 80 to 98% by volume, and fine uniform pores having a predetermined average size within the range of 5 to 100 μm is obtained in sintering (including degreasing), coupled with further acceleration of pore formation due to disappearance of the combustible agent by combustion.

Accordingly, the present invention has been achieved on the basis of the above research results.

In an aspect of the present invention, there is provided a mixed raw material for producing a porous metal sintered product comprising a mixture having a composition (% by weight, "%" represents "% by weight" hereinafter) comprising:

- 0.05 to 10% of water-insoluble hydrocarbon organic solvent having 5 to 8 carbon atoms;
- 0.05 to 5% of surfactant;
- 0.5 to 20% of water-soluble resin binder;
- 5 to 80% of metallic powder having an average size of 0.05 to 500 μm;
- optionally, 0.1 to 40% of combustible agent for accelerating pore formation;
- optionally, 0.1 to 15% of plasticizer comprising at least one of polyhydric alcohols, oils and fats, ethers and esters; and the balance of water.

DETAILED DESCRIPTION OF THE INVENTION

Description will now be made of the composition of the mixed raw material of the present invention as described above.

As used herein and in the calims, the phrase "water-insoluble hydrocarbon organic solvent having 5 to 8 carbon atoms" (referred to as "organic solvent" hereinafter) has the function to form micelles by the action of the surfactant to form fine uniform pores in a formed product by vaporization when the formed product is held at a temperature of 5° C. or higher after forming. However, if the ratio of the organic solvent is less than 0.05%, pores are not sufficiently formed, and thus a porous metal sintered product having desired high porosity cannot be produced. On the other hand, if the ratio exceeds 10%, the size of the micelles is increased, accompanied by an increase in the size of the pores formed in the formed product, thereby abruptly decreasing the strength of the formed product and the metallic sintered product. The ratio of the organic solvent is thus set to 0.05 to 10%, preferably 0.5 to 5%.

The reason the carbon number of the organic solvent is set to 5 to 8 is that there is no liquid having a carbon number of 4 or less at room temperature and atmospheric pressure (all solvents are gaseous), while an organic solvent having a carbon number of 9 or more has lower vapor pressure and causes difficulties in forming pores.

As the organic solvent, neopentane, hexane, isohexane, heptane, isoheptane, benzene, octane and toluene are preferably used.

As used herein and in the claims, the term "surfactant" has the function to form the micelles which involve the organic solvent, as described above. With a ratio of the surfactant of less than 0.05%, the micelle formation is made unstable, while with a ratio over 5%, the function is not further improved. The ratio of the surfactant is thus set to 0.05 to 5%, preferably 0.5 to 3%. A general detergent may be used as the surfactant, and a commercial kitchen neutral synthetic detergent (for example, a 28% mixed aqueous solution containing alkyl glycoside and polyoxyethylene alkyl ether) is sufficient for the surfactant.

As used herein and in the claims, the phrase "water-soluble resin binder" has the function to enhance the strength of the porous formed product to enable handling thereof. With a ratio of the resin binder of less than 0.5%, the desired effect of enhancing strength cannot be obtained, while with a ratio of over 20%, it is difficult to form a predetermined shape. The ratio of the water-soluble resin binder is thus set to 0.5 to 20%, preferably 2 to 10%.

As the water-soluble resin binder, methyl cellulose, hydroxypropylmethyl cellulose, hydroxyethylmethyl cellulose, carboxymethyl cellulose ammonium, ethyl cellulose, and polyvinyl alcohol are preferably used.

As used herein and in the claims, the phrase "metallic powder" can encompass any metallic materials which can be applied to porous metallic products including conventional porous metal sintered products, since the metallic powder constitutes a porous metal sintered product after sintering. However, with an average particle size of less than 0.5 μm, it is difficult to increase the porosity of the sintered product, while with an average particle size of over 500 μm, dispersibility in a mixed raw material deteriorates, thereby making impossible to produce a homogeneous sintered product. The average particle size is thus determined to 0.5 to 500 μm, preferably 5 to 100 μm.

The ratio of the metallic powder is preferably 5 to 80%. The reason for this is that with a ratio of less than 5%, the strength of the sintered product is abruptly decreased, while with a ratio of over 80%, the porosity cannot be easily increased. The ratio of the metallic powder is more preferably 20 to 70%.

(e) Combustible agent for accelerating pore formation

The combustible agent is mixed for further accelerating pore formation by being burned off in degreasing and sintering the porous formed product, as described above. The combustible agent is not limited as long as it is completely burned off at a temperature higher than 300° C. and lower than the sintering temperature of the metallic powder. However, if the combustible agent is powder, the average particle size is preferably 0.1 to 200 μm, more preferably 20 to 100 μm. If the combustible agent is a fiber form, the length is preferably 200 μm or less, more preferably 30 to 120 μm.

If the ratio of the combustible agent is less than 0.1%, the desired effect of accelerating pore formation cannot be obtained. On the other hand, if the ratio exceeds 40%, irregularities easily occur in the surface of the porous formed product during drying, thereby deteriorating surface properties. The ratio of the combustible agent is thus set to 0.1 to 40%, preferably 5 to 20%.

As the combustible agent, pulp, cotton, yarn waste, carboxymethyl cellulose, water-insoluble cellulose resins, polyvinyl butyral resins, polyvinyl resins, acrylic resins and polyester resins are preferably used.

(f) Plasticizer

Polyhydric alcohols, oils and fats, ethers and esters which are added as the plasticizer have the function to provide a formed product with plasticity, and are thus added according to demand. If the ratio of the plasticizer is less than 0.1%, the desired effect cannot be obtained. On the other hand, if the ratio exceeds 15%, the strength of the porous formed product is abruptly decreased. The ratio of the plasticizer is thus set to 0.1 to 15%, preferably 2 to 10%.

Ethylene glycol, polyethylene glycol and glycerin are preferably used as the polyhydric alcohols; sardine oil, rapeseed oil, and olive oil are preferably used as the fats and oils; petroleum ether is used as the ether; and diethyl phthalate, di-n-butyl phthalate, diethylhexyl phthalate, di-n-octyl phthalate, sorbitan monooleate, sorbitan trioleate, sorbitan palmitate, and sorbitan stearate are preferably used as the esters.

The mixed raw material of the present invention is described in detail below with reference to examples.

EXAMPLE 1

Various metallic powders of the materials having the average particle sizes shown in Tables 1 to 6; neopentane (referred to as "A-1" hereinafter), hexane (A-2), isohexane (A-3), heptane (A-4), isoheptane (A-5), benzene(A-6), octane (A-7) and toluene (A-8); the above-described commercial kitchen neutral detergent; methyl cellulose (referred to as "B-1 " hereinafter), hydroxypropylmethyl cellulose (B-2), hydroxyethylmethyl cellulose (B-3), carboxymethyl cellulose ammonium (B-4), ethyl cellulose (B-5), and polyvinyl alcohol (B-6); and polyethylene glycol (referred to as "C-1 " hereinafter), olive oil (C-2), petroleum ether (C-3), n-butyl phthalate (C-4) and sorbitan monooleate (C-5), glycerin (C-6) were prepared as the metallic powder, the organic solvent, the surfactant, water-soluble resin binder, and the plasticizer, respectively. These materials were mixed with water with the compositions shown in Tables 1 to 3 under usual conditions to prepare mixed raw materials 1 to 16 of this invention and comparative mixed raw materials 1 to 8.

Each of these various mixed raw materials was injected into a plaster mold having a cavity surface provided with a plurality of fine through holes to form a molded product. The molded product was subjected to pore formation (formation of a porous molded product), degreasing and sintering under the conditions shown in Table 4 and 5 to produce a porous metal sintered product having the dimensions of 50 mm in diameter×100 mm in length.

The porosity of each of the porous metal sintered products was measured, and any desired ten positions in a longitudinal section including the center line were observed under a metal microscope at a magnification of ×200 to measure the maximum pore size and the minimum pore size at each of the measurement positions. The measured maximum and minimum pore sizes were averaged. The results of measurement are shown in Table 6.

The results shown in Tables 1 to 6 reveal that mixed raw materials 1 to 16 permit the production of porous metal sintered products having high porosity of 80 to 98%, which cannot be easily achieved by conventional porous metal sintered products, accompanied with formation of relatively fine and uniform pores.

On the other hand, comparative mixed raw materials 1 to 8 indicate that if the mixing ratio (shown by * in Table 3) of any one of components of a mixed raw material is outside the range of the present invention, the porous metal sintered product is inferior in at least one of fineness and uniformity of the pores and high porosity.

As described above, when the mixed raw material of the present invention is used for producing a porous metal sintered product, a porous metal sintered product having high porosity and fine and uniform pores can be produced. This causes the industrial advantageous effect of decreasing the weight of the porous metal sintered product and improving the function thereof in various application fields.

EXAMPLE 2

Various metallic powders of the materials and having the average particle sizes shown in Tables 1 to 6; neopentane (referred to as "A-1 " hereinafter), hexane (A-2), isohexane (A-3), heptane (A-4), isoheptane (A-5), benzene (A-6), octane (A-7) and toluene (A-8); the above-described commercial kitchen neutral synthetic detergent; methyl cellulose (referred to as "B-1 " hereinafter), hydroxypropylmethyl cellulose (B-2), hydroxyethylmethyl cellulose (B-3), carboxymethyl cellulose ammonium (B-4), ethyl cellulose (B-5), and polyvinyl alcohol (B-6); polyethylene glycol (referred to as "C-1" hereinafter), olive oil (C-2), petroleum ether (C-3), di-n-butyl phthalate (C-4), and sorbitan monooleate (C-5); and pulp (referred to as "D-1" hereinafter) having the sizes shown in Tables 7 to 9 (in the size column in Tables 1 to 3, numerals without parentheses indicate average particle sizes of powders, and numerals in parentheses indicate fiber lengths), cotton (D-2), yarn waste (D-3), carboxymethyl cellulose (D-4), water-insoluble cellulose resin (D-5), polyvinyl butyral resin (D-6), polyvinyl resin (D-7), acrylic resin (D-8) and polyethylene resin (D-9) were prepared as the metallic powder, the organic solvent, the surfactant, the water-soluble resin binder, the plasticizer, and the combustible material, respectively. These materials were added to water with the compositions shown in Tables 7 to 9 and mixed under usual conditions to prepare raw materials 17 to 32 of this invention and comparative mixed raw materials 9 to 16.

In comparative mixed raw materials 9 to 16, the content of one of the components, which have influence on pore formation, or the average particle size (shown by * in Table 9) of metallic powder is outside the range of the present invention.

Each of these various mixed raw materials was injected into a plaster mold having a cavity surface provided with a plurality of fine through holes to form a molded product. The molded product was subjected to pore formation (formation of a porous molded product), degreasing and sintering under the conditions shown in Tables 10 and 11 to produce a porous metal sintered product having the dimensions of 50 mm in diameter×100 mm in length.

The porosity of each of the porous metal sintered products was measured, and any desired ten positions in a longitudinal section including the center line were observed under a metal microscope at a magnification of ×200 to measure the maximum pore size and the minimum pore size at each of the measurement positions. The measured maximum and minimum pore sizes were averaged. The results of measurement are shown in Table 12.

The results shown in Tables 7 to 12 reveal that mixed raw materials 17 to 32 permit the production of porous metal sintered products having high porosity of 80 to 98%, which cannot be easily achieved by conventional porous metal sintered products, accompanied with formation of relatively fine and uniform pores.

On the other hand, comparative mixed raw materials 9 to 16 indicate that if the mixing ratio (shown by * in Table 3) of any one of components of a mixed raw material is outside the range of the present invention, the porous metal sintered product is inferior in at least one of fineness and uniformity of the pores and high porosity.

As described above, when the mixed raw material of the present invention is used for producing a porous metal sintered product, a porous metal sintered product having high porosity and fine and uniform pores can be produced. This causes the industrial advantageous effect of decreasing the weight of the porous metal sintered product and improving the function thereof in various application fields.

TABLE 1

| Type | Average Particle Size (μm) | Composition | Metallic Powder | Organic Solvent | Surfactant | Water-Soluble Resin Binder | Plasticizer | Water |
|---|---|---|---|---|---|---|---|---|
| Mixed Raw Material of This Invention | | | | | | | | |
| 1 | 9 | Ni | 50 | A-1:0.6 | 2.5 | B-4:4<br>B-5:1 | — | balance |
| 2 | 40 | Cu | 50 | A-2:0.5 | 0.07 | B-1:5 | — | balance |
| 3 | 460 | Cu-10% Ni | 60 | A-6:0.5<br>A-8:1 | 4.8 | B-3:0.6 | — | balance |
| 4 | 2<br>40 | Ni<br>Cu | 25<br>25 | A-7:0.07 | 2 | B-1:2<br>B-3:2 | — | balance |
| 5 | 20 | Au | 78 | A-2:5<br>A-4:2.5<br>A-7:2 | 3 | B-2:7 | — | balance |
| 6 | 40 | Ag | 70 | A-4:0.4 | 4 | B-5:2 | — | balance |
| 7 | 110<br>35<br>9 | Fe<br>Cr<br>Ni | 37<br>9<br>4 | A-5:5 | 2 | B-4:15 | — | balance |
| 8 | 110<br>85 | Fe<br>Co | 3<br>3 | A-3:0.3<br>A-4:0.7 | 0.5 | B-1:10<br>B-2:4<br>B-5:5 | — | balance |

TABLE 2

| Type | Average Particle Size (μm) | Composition | Metallic Powder | Organic Solvent | Surfactant | Water-Soluble Resin Binder | Plasticizer | Water |
|---|---|---|---|---|---|---|---|---|
| Mixed Raw Material of This Invention | | | | | | | | |
| 9 | 12 | SUS310S | 55 | A-2:0.2<br>A-4:0.2<br>A-7:0.2 | 2.5 | B-1:9.5<br>B-3:9.5 | C-6:2.5 | balance |
| 10 | 108 | SUS304 | 40 | A-2:0.8 | 0.08 | B-2:5 | C-3:1.5<br>C-5:1 | balance |
| 11 | 460 | Cu-10% Ni | 75 | A-4:3 | 2 | B-1:0.8 | C-3:0.2 | balance |
| 12 | 13<br>0.6 | Ni<br>Cr | 24<br>6 | A-3:9 | 1 | B-3:5<br>C-4:3 | C-1:9 | balance<br>C-5:2 |
| 13 | 15 | Co-10% Ni- | 45 | A-5:0.08 | 1.5 | B-4:4 | C-2:0.1 | balance |
| 14 | 12 | Co-10% Ni-<br>20% Cr-<br>15% W | 6 | A-4:0.6 | 1.5 | B-2:8<br>B-4:0.5<br>B-6:0.5 | C-2:5<br>C-3:5 | balance |
| 15 | 110<br>65<br>13 | Fe<br>Co<br>Ni | 25<br>13.5<br>7.5 | A-1:0.3<br>A-6:0.3 | 5 | B-5:5 | C-4:1 | balance |
| 16 | 12 | Ni | 45 | A-8:0.7 | 0.6 | B-6:5 | C-5:6 | balance |

TABLE 3

| Type | Average Particle Size (μm) | Composition | Metallic Powder | Organic Solvent | Surfactant | Water-Soluble Resin Binder | Plasticizer | Water |
|---|---|---|---|---|---|---|---|---|
| Comparative Mixed Raw Material | | | | | | | | |
| 1 | 9 | Ni | 50 | A-2:0.02* | 2.5 | B-1:5 | — | balance |
| 2 | 9 | Ni | 50 | A-1:6*<br>A-3:6 | 2.5 | B-3:5 | — | balance |
| 3 | 110<br>65 | Fe<br>Co | 3<br>3 | A-4:1 | 0.01* | B-6:10 | — | balance |
| 4 | 560* | SUS304 | 40 | A-6:2 | 2 | B-2:3<br>B-3:2 | — | balance |
| 5 | 0.3* | Ag | 50 | A-8:0.5 | 1 | B-1:9 | C-4:2<br>C-5:2 | balance |
| 6 | 9 | Ni | 86* | A-2:0.5<br>A-4:0.2<br>A-6:0.3 | 1 | B-5:1 | C-1:1 | balance |
| 7 | 13<br>0.6 | Ni<br>Cr | 24<br>6 | A-4:0.01* | 1 | B-3:5 | C-2:3 | balance |
| 8 | 580* | Cu | 40 | A-4:0.6 | 2 | B-4:6<br>B-6:3 | C-2:2<br>C-3:2<br>C-4:2 | balance |

*: outside the range of this invention

TABLE 4

| Type | Pore Formation Condition | | | Degreasing Condition | | | Sintering Condition | | |
|---|---|---|---|---|---|---|---|---|---|
| | Atmosphere | Temperature (°C.) | Time (min.) | Atmosphere | Temperature (°C.) | Time (min.) | Atmosphere | Temperature (°C.) | Time (min.) |
| Mixed Raw Material of This Invention | | | | | | | | | |
| 1 | Air | 25 | 90 | Air | 500 | 60 | Hydrogen | 1200 | 60 |
| 2 | | 30 | | | | | | 1000 | |
| 3 | | 105 | 20 | Hydrogen | | | | | |
| 4 | | 25 | 90 | Air | | | | 1060 | 120 |
| 5 | | 5 | 180 | | 700 | | Vacuum | 1030 | 60 |
| 6 | | 10 | 120 | | 600 | | | 900 | 240 |
| 7 | Nitrogen | | | Hydrogen | | | Hydrogen | 1250 | 30 |
| 8 | Argon | | | Air | 500 | | | 1300 | 60 |
| 9 | Air | 30 | 90 | | | | | 1250 | |
| 10 | | | | | | | | | |
| 11 | | 10 | 120 | Hydrogen | 600 | | | 1000 | |
| 12 | Argon | 20 | 90 | | | | | 1250 | |

TABLE 5

| Type | Pore Formation Condition | | | Degreasing Condition | | | Sintering Condition | | |
|---|---|---|---|---|---|---|---|---|---|
| | Atmosphere | Temperature (°C.) | Time (min.) | Atmosphere | Temperature (°C.) | Time (min.) | Atmosphere | Temperature (°C.) | Time (min.) |
| Mixed Raw Material of This Invention | | | | | | | | | |
| 13 | Air | 105 | 20 | Air | 500 | 60 | Vacuum | 1250 | 60 |
| 14 | | | | | | | | 1350 | |
| 15 | | 25 | 90 | | | | Hydrogen | 1250 | |
| 16 | | | | | 700 | | | 1100 | |
| Comparative Mixed Raw Material | | | | | | | | | |
| 1 | | | | | 500 | | | 1200 | |
| 2 | | | | | | | | | 120 |
| 3 | | 10 | 120 | Hydrogen | 600 | | | 1250 | 60 |
| 4 | | 30 | 90 | Air | 500 | | | | |
| 5 | | 5 | 180 | | 700 | | Vacuum | 900 | |
| 6 | | 25 | 90 | | 500 | | Hydrogen | 1250 | |
| 7 | | | | | | | | | |
| 8 | | | | | | | | 1000 | |

TABLE 6

| Type | | Porous Metal Sintered Product | | | Type | | Porosity (% by volume) | Porous Metal Sintered Product | |
|---|---|---|---|---|---|---|---|---|---|
| | | Porosity (% by volume) | Average Maximum Pore Size (μm) | Average Minimum Pore Size (μm) | | | | Average Maximum Pore Size (μm) | Average Minimum Pore Size (μm) |
| Mixed Raw Material of This Invention | 1 | 92 | 85 | 77 | Mixed Raw Material of This Invention | 13 | 84 | 10 | 8 |
| | 2 | 90 | 88 | 75 | | 14 | 88 | 98 | 92 |
| | 3 | 84 | 98 | 87 | | 15 | 89 | 77 | 70 |
| | 4 | 81 | 13 | 10 | | 16 | 80 | 89 | 76 |
| | 5 | 88 | 97 | 90 | Comparative | 1 | 48 | 15 | 4 |

TABLE 6-continued

| | Porous Metal Sintered Product | | | | Porous Metal Sintered Product | | |
|---|---|---|---|---|---|---|---|
| Type | Porosity (% by volume) | Average Maximum Pore Size (μm) | Average Minimum Pore Size (μm) | Type | Porosity (% by volume) | Average Maximum Pore Size (μm) | Average Minimum Pore Size (μm) |
| 6 | 94 | 58 | 50 | Mixed Raw Material | 2 | 55 | 380 | 28 |
| 7 | 93 | 81 | 72 | | 3 | 48 | 45 | 18 |
| 8 | 82 | 79 | 68 | | 4 | 33 | 260 | 25 |
| 9 | 92 | 94 | 86 | | 5 | 29 | 25 | 12 |
| 10 | 81 | 54 | 41 | | 6 | 36 | 65 | 18 |
| 11 | 87 | 56 | 51 | | 7 | 20 | 15 | 5 |
| 12 | 97 | 100 | 91 | | 8 | 45 | 290 | 35 |

TABLE 7

| | | | Composition (% by weight) | | | | | | |
|---|---|---|---|---|---|---|---|---|---|
| Type | Average Pore Size (μm) | Material | Metallic Powder | Organic Solvent | Surfactant | Resin Binder | Size (μm) | Combustible Agent | Plasticizer | Water |

Mixed Raw Material of This Invention

| 17 | 9 | Pure Ni | 50 | A-2:0.5 | 0.1 | B-1:2, B-3:3 | 40 | D-7:2 | — | balance |
| 18 | 500 | Pure Cu | 80 | A-6:5 | 0.05 | B-2:1.5 | 100 | D-9:0.1 | — | balance |
| 19 | 20 | Cu-10% Ni | 60 | A-3:0.3, A-4:0.7 | 1.0 | B-1:3, B-5:1 | (120) (200) | D-1:0.8 D-3:0.2 | — | balance |
| 20 | 10 | SUS316L | 50 | A-1:1.5 | 0.9 | B-4:0.5 | (120) | D-2:5 | — | balance |
| 21 | 25 | SUS304 | 50 | A-2:3, A-7:0.5 | 1.5 | B-1:3, B-4:5 | 60 40 | D-4:3 D-7:7 | — | balance |
| 22 | 30 | SUS430 | 10 | A-5:10 | 3 | B-2:6 | 60 | D-8:40 | — | balance |
| 23 | 48 | Pure Ag | 5 | A-8:0.05 | 5 | B-1:18 B-6:2 | 100 | D-6:1 | — | balance |
| 24 | 0.5 | Pure Au | 20 | A-2:2.0 | 0.1 | B-3:10 | 0.1 | D-5:5 | — | balance |

TABLE 8

| | | | Composition (% by weight) | | | | | | |
|---|---|---|---|---|---|---|---|---|---|
| Type | Average Pore Size (μm) | Material | Metallic Powder | Organic Solvent | Surfactant | Resin Binder | Size (μm) | Combustible Agent | Plasticizer | Water |

Mixed Raw Material of This Invention

| 25 | 9 | Pure Ni | 50 | A-5:1 | 0.1 | B-1:2, B-2:3 | (120) | D-1:5 | C-1:1, C-4:05 | balance |
| 26 | 500 | Pure Cu | 80 | A-7:5 | 0.05 | B-3:0.5 | 40 | D-7:0.1 | C-2:0.1 | balance |
| 27 | 0.5 | Pure Au | 5 | A-2:0.05 | 5 | B-4:20 | 60 | D-4:40 | C-3:15 | balance |
| 28 | 10 | Ni-20% Cr | 50 | A-1:0.2, A-3:0.8 | 0.1 | B-2:1, B-5:1 | 100 | D-9:5 | C-1:1 C-5:1 | balance |
| 29 | 25 | SUS304 | 60 | A-4:1.5 | 0.9 | B-6:2 | (200) 100 | D-3:3 D-6:1 | C-1:2 | balance |
| 30 | 10 | SUS316L | 40 | A-8:10 | 1.5 | B-2:3 | (120) | D-2:12 | C-3:11 | balance |
| 31 | 50 | Ni- | 60 | A-2:0.7, | 0.2 | B-1:0.5 | 0.1 | D-5:2 | C-1:0.3, | balance |

TABLE 8-continued

| | | Composition (% by weight) | | | | | | | | | |
|---|---|---|---|---|---|---|---|---|---|---|---|
| Type | Average Pore Size (μm) | Material | Metallic Powder | Organic Solvent | Surfactant | Resin Binder | Size (μm) | Combustible Agent | Plasticizer | Water |
| 32 | 25 | 25% Cr-10% Fe Fe-25% Cr-30% Ni | 55 | A-6:0.8 A-2:2 | 2 | B-3:1.5 B-2:1.5 | 60 | D-8:5 | C-4:0.7 C-1:0.2, C-2:0.2 | balance |

TABLE 9

| | | Composition (% by weight) | | | | | | | | | |
|---|---|---|---|---|---|---|---|---|---|---|---|
| Type | Average Pore Size (μm) | Material | Metallic Powder | Organic Solvent | Surfactant | Resin Binder | Size (μm) | Combustible Agent | Plasticizer | Water |
| Comparative Mixed Raw Material | | | | | | | | | | |
| 17 | 0.2* | Pure Ag | 40 | A-2:1.1 | 0.8 | B-1:1.5, B-2:3.5 | 100 | D-6:4 | — | balance |
| 18 | 550* | SUS316L | 60 | A-1:1, A-7:2 | 5 | B-4:2 | (120) | D-1:1 | — | balance |
| 19 | 9 | Pure Ni | 85* | A-2:0.1, A-8:0.3 | 0.1 | B-6:3 | (200) 0.1 40 | D-3:0.5 D-5:0.2 D-7:1 | — | balance |
| 20 | 10 | SUS316L | 50 | —* | 1 | B-3:4, B-5:1 | 40 | D-7:3 | — | balance |
| 21 | 10 | SUS304 | 10 | A-2:12* | 0.1 | B-1:5 | 60 | D-4:35 | — | balance |
| 22 | 0.5 | Pure Au | 70 | A-3:1, A-6:3 | 0.02* | B-1:1, B-3:1 | (120) | D-2:0.3 | — | balance |
| 23 | 10 | SUS316L | 50 | A-4:0.02* | 4 | B-5:2 | (200) | D-3:0.5 | C-1:2 | balance |
| 24 | 0.5 | Pure Au | 60 | A-5:2 | —* | B-3:1 | (120) | D-i:D.5 | C-3:3 | balance |

TABLE 10

| | Pore Formation Condition | | | Degreasing Condition | | | Sintering Condition | | |
|---|---|---|---|---|---|---|---|---|---|
| Type | Atmosphere | Temperature (°C.) | Time (min.) | Atmosphere | Temperature (°C.) | Time (min.) | Atmosphere | Temperature (°C.) | Time (min.) |
| Mixed Raw Material of This Invention | | | | | | | | | |
| 17 | Air | 50 | 30 | Air | 550 | 60 | Hydrogen | 1200 | 10 |
| 18 | | | 40 | | | | | 1000 | 120 |
| 19 | Nitrogen | 5 | 240 | Vacuum | 600 | 30 | | 1050 | 30 |
| 20 | Air | 20 | 120 | Air | 50 | 60 | Vacuum | 1250 | 60 |
| 21 | | 70 | 15 | Vacuum | | | | | |
| 22 | | 50 | 40 | | | | Hydrogen | 1200 | 30 |
| 23 | | 70 | 20 | Air | | 30 | Air | 900 | 120 |
| 24 | | 60 | 30 | | | | | 1010 | 60 |
| 25 | | 50 | | | 550 | 40 | Hydrogen | 1200 | 15 |
| 26 | Nitrogen | 6 | 240 | | | | | 1000 | 20 |
| 27 | | 25 | 120 | | 500 | 60 | Air | 1010 | 120 |
| 28 | | | | Vacuum | 600 | 30 | Vacuum | 1000 | 60 |

TABLE 11

| Type | Pore Formation Condition Atmosphere | Temperature (°C.) | Time (min.) | Degreasing Condition Atmosphere | Temperature (°C.) | Time (min.) | Sintering Condition Atmosphere | Temperature (°C.) | Time (min.) |
|---|---|---|---|---|---|---|---|---|---|
| Mixed Raw Material of This Invention | | | | | | | | | |
| 29 | Air | 50 | 40 | Vacuum | 550 | 60 | Vacuum | 1250 | 30 |
| 30 | | 50 | | Air | 500 | | Hydrogen | | 15 |
| 31 | Ar | 80 | 25 | Hydrogen | 600 | | Vacuum | 1300 | 60 |
| 32 | | | | | | | | | |
| Comparative Mixed Raw Material | | | | | | | | | |
| 9 | Air | 50 | 50 | Air | 500 | 45 | Air | 900 | 120 |
| 10 | | | | | | | Vacuum | 1250 | 60 |
| 11 | | | | | | | Hydrogen | 1200 | |
| 12 | | | | | | | | 1250 | |
| 13 | | | | | | | Vacuum | 1200 | |
| 14 | | | | | | | Air | 1010 | |
| 15 | | | | | | | Hydrogen | 1250 | |
| 16 | | | | | | | Air | 1010 | 120 |

TABLE 12

| Type | | Porous Metal Sintered Product Porosity (% by volume) | Average Maximum Pore Size (μm) | Average Minimum Pore Size (μm) | Type | | Porous Metal Sintered Product Porosity (% by volume) | Average Maximum Pore Size (μm) | Average Minimum Pore Size (μm) |
|---|---|---|---|---|---|---|---|---|---|
| Mixed Raw | 17 | 91 | 78 | 72 | Mixed Raw | 29 | 96 | 77 | 70 |
| Material of | 18 | 83 | 95 | 87 | Material of | 30 | 96 | 97 | 91 |
| This | 19 | 94 | 69 | 61 | This | 31 | 88 | 75 | 68 |
| Invention | 20 | 92 | 73 | 70 | Invention | 32 | 85 | 70 | 64 |
| | 21 | 95 | 55 | 49 | Comparative | 9 | 69 | 8 | 4 |
| | 22 | 96 | 99 | 90 | Mixed Raw | 10 | 91 | 115 | 67 |
| | 23 | 90 | 97 | 89 | Material | 11 | 65 | 88 | 80 |
| | 24 | 85 | 12 | 7 | | 12 | 55 | 25 | 10 |
| | 25 | 94 | 92 | 83 | | 13 | 97 | 121 | 88 |
| | 26 | 80 | 98 | 88 | | 14 | 75 | 35 | 15 |
| | 27 | 81 | 8 | 5 | | 15 | 61 | 42 | 27 |
| | 28 | 97 | 75 | 68 | | 16 | 70 | 38 | 20 |

What is claimed is:

1. A mixed raw material composition for producing a porous metal sintered product comprising:

0.05 to 10% by weight of a water-insoluble hydrocarbon organic solvent having 5 to 8 carbon atoms; 0.05 to 5% by weight of a surfactant;

5 to 80% by weight of a metallic powder having an average particle size of 0.5 to 500 μm; and a balance of water.

2. The composition of claim 1, further comprising 0.1 to 40 by weight of a combustible agent for accelerating pore formation.

3. The composition of claim 1, further comprising a plasticizer comprising at least one selected from the group consisting of a polyhydric alcohol, an oil, a fat, an ether and an ester.

4. The composition of claim 2, further comprising a plasticizer comprising at least one selected from the group consisting of a polyhydric alcohol, an oil, a fat, an ether and an ester.

5. A porous metal sintered article formed from a mixed raw material composition comprising:

0.05 to 10% by weight of a water-insoluble hydrocarbon organic solvent having 5 to 8 carbon atoms;

0.05 to 5% by weight of a surfactant;

5 to 80% by weight of a metallic powder having an average particle size of 0.5 to 500 μm; and a balance of water.

6. The article of claim 5, further comprising 0.1 to 40% by weight of a combustible agent for accelerating pore formation.

7. The article of claim 5, further comprising a plasticizer comprising at least one selected from the group consisting of a polyhydric alcohol, an oil, a fat, an ether and an ester.

8. The article of claim 6, further comprising a plasticizer comprising at least one selected from the group consisting of a polyhydric alcohol, an oil, a fat, an ether and an ester.

9. A process for forming a porous metal sintered article from a mixed raw material composition comprising the steps of:

mixing 0.05 to 10% by weight of a water-insoluble hydrocarbon organic solvent having 5 to 8 carbon atoms; 0.05 to 5% by weight of a surfactant; 5 to 80% by weight of a metallic powder having an average particle size of 0.5 to 500 μm; and a balance of water to obtain uniformly dispersed micelles;

shaping the mixture;

maintaining the mixture at a temperature of 5° C. or higher to allow vaporization of the solvent;

sintering and degreasing the mixture to form the porous metal sintered article having high porosity and uniform pores in a range of 5 to 100 μm.

10. The process of claim 9, further comprising adding 0.1 to 40% by weight of a combustible agent to the mixture for accelerating pore formation.

11. The process of claim 9, further comprising adding a plasticizer comprising at least one selected from the group consisting of a polyhydric alcohol, an oil, a fat, an ether and an ester to the mixture.

12. The process of claim 10, further comprising adding a plasticizer comprising at least one selected from the group consisting of a polyhydric alcohol, an oil, a fat, an ether and an ester to the mixture.

* * * * *